United States Patent [19]

Münning et al.

[11] Patent Number: 4,673,067
[45] Date of Patent: Jun. 16, 1987

[54] ADJUSTABLE SHOCK ABSORBER, ESPECIALLY FOR MOTOR VEHICLES

[75] Inventors: Hans Münning; Jürgen Bock; Bernd Oldach; Josef Ladic, all of Cologne; Max-Otto Rauert, Ennepetal; Hugo Emde, Hagen; Dietrich Petzsch; Johannes J. de Baan, both of Ennepetal, all of Fed. Rep. of Germany

[73] Assignee: August Bilstein GmbH & Co. KG, Ennepetal, Fed. Rep. of Germany

[21] Appl. No.: 847,195

[22] Filed: Apr. 2, 1986

Related U.S. Application Data

[62] Division of Ser. No. 648,291, Sep. 6, 1984.

[30] Foreign Application Priority Data

Sep. 24, 1983 [DE] Fed. Rep. of Germany ....... 3334704
Aug. 1, 1984 [DE] Fed. Rep. of Germany ....... 3428306

[51] Int. Cl.⁴ .............................................. F16F 9/46
[52] U.S. Cl. ................................... 188/299; 188/280; 188/282; 188/285; 188/322.15; 188/322.22
[58] Field of Search ............... 188/279, 280, 282, 285, 188/299, 319, 322.13, 322.14, 322.15, 320, 322.22

[56] References Cited

U.S. PATENT DOCUMENTS 4,463,839  8/1984  Ashiba ................................ 188/299

FOREIGN PATENT DOCUMENTS 1084528  6/1960  Fed. Rep. of Germany ...... 188/299
2911768 10/1980  Fed. Rep. of Germany .
3215614  2/1983  Fed. Rep. of Germany .
3241984  6/1983  Fed. Rep. of Germany .
1094025  5/1955  France .
1095506  6/1955  France .
1130621  2/1957  France .
57-173632 10/1982 Japan .............................. 188/322.15

Primary Examiner—Douglas C. Butler
Attorney, Agent, or Firm—Karl F. Ross; Herbert Dubno

[57] ABSTRACT

An adjustable shock absorber for motor vehicles comprises a cylinder containing damping fluid, a piston rod arranged to be axially displaceable in the cylinder, and a damping piston secured to the inner end of the piston rod. The damping piston divides the cylinder chamber into two working chamber compartments and is provided with fluid flow passages which produce damping forces, the effective cross-section of these flow passages being controllable by a throttling member and an electromagnetic drive controlling the throttling member, with the electromagnetic drive including a coil winding which is mounted in the damping piston. In order to achieve improved control of the damping force the throttling member is under the influence on the one hand of the fluid pressure difference between the two working chamber compartments and on the other hand of a restoring force which is created by the electromagnetic drive. Preferably, a hydraulic compensating device which reinforces this restoring force is provided between the throttling member and the electromagnetic drive which counteracts the hydraulic displacement of the throttling member.

7 Claims, 17 Drawing Figures

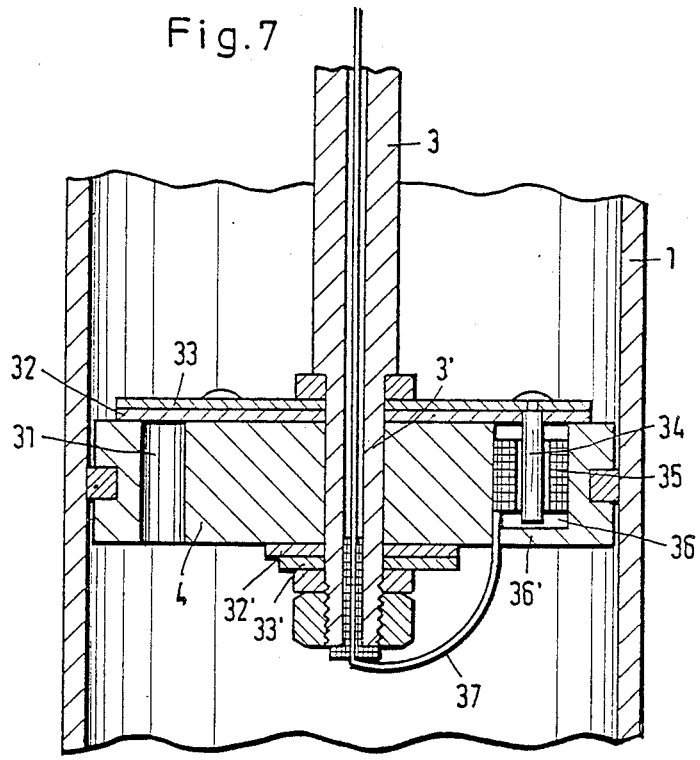
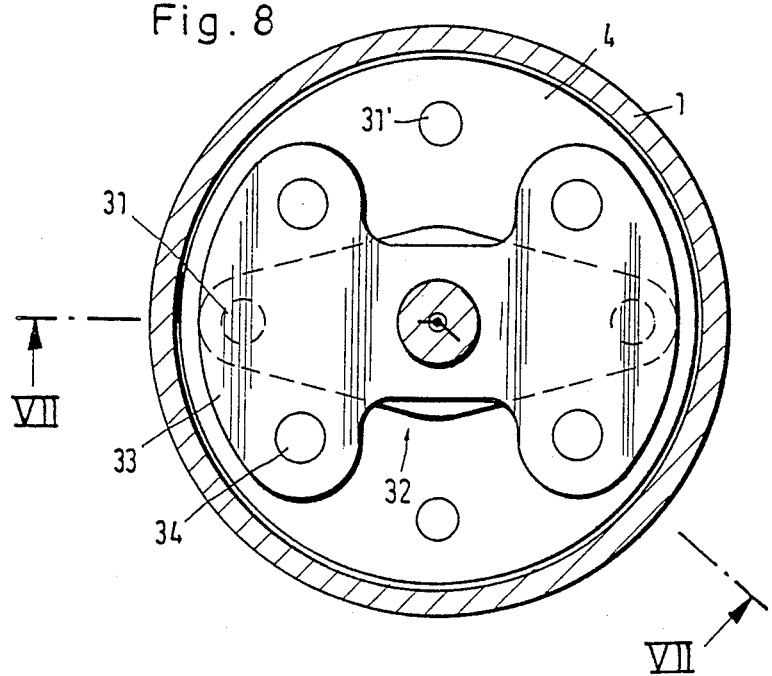

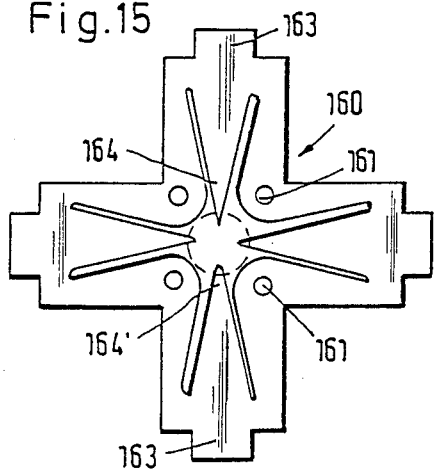
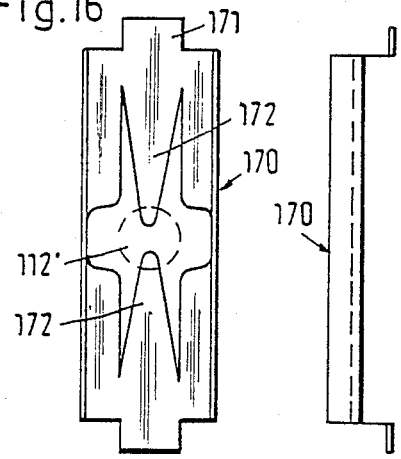

ADJUSTABLE SHOCK ABSORBER, ESPECIALLY FOR MOTOR VEHICLES

This is a division of co-pending application Ser. No. 648,291 filed on Sept. 6, 1984.

FIELD OF THE INVENTION

This invention relates to an adjustable shock absorber, particularly for motor vehicles, comprising a cylinder containing a damping fluid, especially a damping liquid, a piston rod axially displaceable in the cylinder and extending in sealed manner into the cylinder, and a damping piston which divides the cylinder chamber into two working chamber compartments and is provided with fluid flow passages which produce damping forces. The effective cross-section of these passages is controllable by means of a throttling member and by means of an electromagnetic drive comprising a magnetic circuit and a coil winding which acts upon the throttling member, and the electromagnetic drive is mounted in the damping piston imediately adjacent to the fluid flow passages and the throttling member.

BACKGROUND OF THE INVENTION

Adjustable shock absorbers for motor vehicles having electromagnetically displaceable throttling members are known from West German patent specification No. 10 84 528, West German published patent application No. 32 15 614 and West German published patent application No. 32 41 984. In these shock absorbers a throttling plate mounted to be rotationally displaceable in the damping piston, is used as a throttling member.

The throttling plate is provided with appropriately positioned holes therethrough which can be brought into alignment to a greater or lesser degree with through-flow passages provided in the piston body. Alternatively a through-flow hole lying in the bypass to the fluid flow passages of the piston is freed to a greater or lesser extent.

The displacement of the throttling plate is effected by means of a control rod which is connected rigidly to the plate and which extends through the full length of the piston rod, which is hollow. The control rod can be brought into different rotational set positions by means of an electromagnet mounted at the free end of the piston rod in a suitably projecting piston rod head.

In another known adjustable shock absorber for motor vehicles, as described in West German published patent application No. 29 11 768, an electromagnet coil is mounted at the outer end of a hollow piston rod, and a control rod which serves as an armature for the coil extends through the full length of the piston rod and is axially displaceable therein. The inner end of the control rod permits bypass openings in the piston rod in the vicinity of the damping piston to be closed off to a greater or lesser degree.

In these known electromagnetically adjustable shock absorbers it is a common feature that in spite of far-reaching objectives it is only possible to achieve a coarse presetting of the throttling member and thus also of the desired variable damping force behavior, since, in respect of their setting means, these shock absorbers are very sluggish in terms of their inertia. The fact that the control rod extends through the hollow piston rod to its full length and lies between the electromagnetic drive means on the one hand and the throttling member on the other hand contributes to this to a substantial degree.

Electromagnetically adjustable shock absorbers of the type referred to above are also already known from French patent specifications Nos. 1094025, 1095506 and 1130621. In these shock absorbers electromagnetic drive means comprising magnetic circuits and coil windings and acting upon the throttling member are mounted in the damping piston immediately adjacent to the fluid flow passages and the throttling member. The throttling member is, in all these cases, formed as a throttling piston which is mounted to be displaceable in the longitudinal direction of the piston rod against a spring bias. The throttling piston is set to a fully defined throttling position in dependence upon the particular current flow in the coil winding and is maintained in that position, and indeed independently of the changing fluid pressures arising in the working chamber compartments, since those pressures are compensated by the equal size fluid pressure reaction surfaces provided on the throttling piston, whereby the changing pressures have no effect on the position of the throttling piston. Consequently, it is still only possible to achieve a comparatively coarse damping setting, with throttling holes of constant cross-section producing a characteristic exponential damping force curve in dependence upon the piston speed.

OBJECT OF THE INVENTION

It is therefore an object of the present invention to provide an electromagnetically adjustable shock absorber of the type described above whose damping characteristic is essentially linear in nature, yet which can be set and/or adjusted steplessly and over the widest range desired, and wherein the damping force adjustment can be carried out with the maximum sensitivity, even within the individual phases of movement of the shock absorber, and desirably with adjustment of the electrical control current being capable of being effected either manually or automatically, for example under the control of a computer.

SUMMARY OF THE INVENTION

This object is achieved in accordance with the present invention, in that the throttling member is provided with suitably positioned fluid pressure reaction surfaces to cause displacement thereof in dependence on the fluid pressure difference between the two working chamber compartments, and in that the electromagnetic drive exerts on the throttling member an adjustable restoring force acting in opposition to the aforesaid displacement.

By this means a highly sensitive, yet stepless setting of the desired damping force curve, linearly dependent on the piston speed, is possible, since the throttling member on the one hand attempts to move under the effect of the hydraulic driving pressure to an appropriate open or alternative setting in the sense of opening the fluid flow passages to a greater or lesser extent, yet on the other hand is prevented more or less strongly from doing so by the counteracting restoring force of the electromagnetic drive. The electromagnetic control extends preferably to the whole throttling member of the piston and to all its throttling elements forming the throttling member, i.e. not just to a bypass provided in the piston.

The electromagnetic drive is preferably so arranged that its restoring force is equal to zero in the rest position of the throttling member and increases with increasing hydraulic displacement of the throttling member. In the rest setting of the throttling member the electromagnetic restoring force is thus zero and ineffective regardless of the control current flowing through the coil winding; it increases however with the departure of the throttling member from the zero or rest setting, with the amount of the increase in the restoring force being dependent upon the current flowing through the coil winding.

Thus, one can achieve not only adjustability of the shock absorber, but also an ability to control the shock absorber without complex control means and using only direct-current based displacement. Even without regulation of the damping force the shock absorber has a defined damping characteristic and can be set to different hardnesses by predetermined changes in the current supply. It can also be used as a normal shock absorber if one dispenses with the current supply and control means.

Insofar as the shock absorber is provided with a throttling member mounted to be rotationally displaceable in the damping piston and is also provided with throughflow holes in the throttling member, these holes being brought into greater or lesser alignment with flow passages in the fixed piston body, for the hydraulic displacement of the rotationally displaceable throttling member at least two flow inlet holes are provided between the throttling member and the fixed piston body which are in communication with the one and with the other working chamber compartment respectively, and in each of which holes, viewed in the direction of rotational displacement of the throttling member, there are opposed fluidpressure reaction surfaces, one provided on the throttling member and the other on the piston body. Preferably, the throttling member is formed as a ring armature provided with alternate differently poled permanent magnets, the armature being mounted rotatably in the piston body and encircling a coil winding of an electromagnet forming the electromagnetic drive. The coil winding is mounted centrally of the piston body and is provided with a plurality of radial pole pieces.

Insofar as the shock absorber is provided with valve plates as throttling members, especially valve spring plates, closing off the fluid flow passages in the damping piston, one can secure rod armatures on the valve plates or on support plates provided on the rearward side of the valve plates, these rod armatures projecting into coil windings set in corresponding receiving holes in the damping piston, the coil windings being part of an electromagnet forming the electromagnetic drive. However, this arrangement requires a comparatively strong electromagnetic drive.

It is extremely advantageous if, in accordance with a further preferred feature of the invention, a hydraulic compensating device reinforcing the restoring force is provided between the valve plate and the electromagnetic drive which acts in opposition to its hydraulic displacement. One such compensating device preferably has at least one support member engaging the rear side of the valve plate and hydraulically drivable in opposition to the valve plate, the support member being mounted displaceably in a pressure reaction chamber from which there branches off a liquid supply line leading to the working chamber compartment which lies on the inflow side with reference to the associated valve plate and also a relief passage leading to the other working chamber compartment, the mouth of the relief passage being closable by an auxiliary valve plate which is arranged to flex under liquid pressure and on which the electromagnetic drive acts with adjustable restoring force. In this way it is possible, even with very weak electromagnetic drive and restoring forces, to control the valve plate in a sensitive manner, since the comparatively strong liquid pressure present at its inflow side is compensated to a substantial degree by the counterpressure of the oppositely acting hydraulically drivable support member.

In most cases one can use as the electromagnetic drive an electromagnet provided with a coil winding, a magnetic circuit and a movable armature. However, it is basically possible also, and in order to achieve a particularly rapid and sensitive control of the throttling member setting of real advantage, if as the electromagnetic drive for the control of the auxiliary valve plate one uses a moving coil mounted on the auxiliary valve plate and which moves in an appropriately dimensioned annular gap of a permanent magnet provided in the piston. Using this moving coil principle one can achieve an extremely rapid adjustment of the damping force properties, so that in consequence damping characteristics of any desired type can be obtained.

According to a further preferred feature of the invention, for both the compression and expansion phase damping, one need provide only one single throttling valve member with a pressure reaction chamber and electromagnetically energizable control valve, with these components being mounted tightly and compactly in the damping piston. For this purpose the throttling valve member on its pressurization side lying opposite to the pressure reaction chamber comprises, in addition to its first pressure reaction surface which closes off the fluid flow passages, a second pressure reaction surface of approximately the same size which is subjected to the fluid pressure in the working chamber compartment surrounding the valve member, with control throttles being incorporated in both fluid connecting passages leading from the pressure reaction chamber to the two working chamber compartments. These throttles are controllable reciprocally by the control valve which is displaceable in dependence upon the pressure difference between the two working chamber compartments, in such a manner that they connect the pressure reaction chamber with the working chamber compartment which is at the then lower fluid pressure to a lesser, throttled degree, whereas they connect the pressure reaction chamber to the working chamber compartment which is at the then higher fluid pressure to a stronger, throttled degree.

It is in consequence essential that a total of three different pressure reaction surfaces are provided on the throttling valve member, namely the active surfaces lying on one side of the valve member and subjected to the different pressures in the two working chamber compartments, and the reaction surface facing the pressure reaction chamber and lying on the other side of the throttling valve member and which in its dimensions corresponds substantially to the total surface area of the two oppositely disposed reaction surfaces.

Thus, in the rest position of the shock absorber, the equal pressures in all three, chambers mutually balance out in their effect on the throttling valve member, so that the latter remains in its closed position in which it completely closes off the fluid flow passages. However, as soon as the piston performs a movement, and indeed whether this is in the compression direction or in the expansion direction, the pressure reaction chamber is connected with greater freedom, i.e. is less throttled, to the working chamber compartment which is then at the lower pressure, and additionally is more strongly throttled off from the other working chamber compartment, so that this leads in each case to a corresponding pressure drop in the reaction chamber and consequently to an opening movement of the throttling valve member which is always directed in the same sense. The throttling valve member thus always opens in the same direction independently of the direction of movement of the piston.

Preferably, feedback spring elements are provided between the throttling valve member and the control valve which, in dependence upon the opening displacement movement of the throttling valve member, exert a restoring force on the control valve which is in opposition to the particular hydraulic displacement force. By this means, in the event of any possible electric current failure in the electromagnet which energizes the control valve, a satisfactory damping force curve can still be achieved, i.e. a suitable emergency function of the shock absorber results, both in the expansion phase and also in the compression phase, Furthermore, it has been found that oscillations in the damping piston, especially of its control valve, can be avoided by this arrangement.

The damping piston is preferably provided with an insert member containing the control valve and its control throttles as well as the fluid connecting passages leading from the pressure reaction chamber to the two working chamber compartments. At its periphery the insert member carries the annular pressure reaction chamber as well as the throttling valve member which closes off the pressure reaction chamber in the manner of a cap and which is also of annular configuration. The throttling valve member is guided on both sides of the pressure reaction chamber at the periphery of the insert member to be axially displaceable and sealed in relation thereto, and the throttling valve member also comprises an annular shoulder separating its two circumferential reaction surfaces from each other, with the shoulder being engageable with a closure edge positioned on the piston body adjacent to its through-flow passages and extending around the piston body. In this way one has a modular unit containing the essential functional components and which can easily be mounted in the damping piston body.

BRIEF DESCRIPTION OF THE DRAWINGS

A number of embodiments of an adjustable shock absorber in accordance with the invention will now be described by way of example and with reference to the accompanying drawing. In the drawing:

FIGS. 7 and 8 are views in section and in plan respectively of a further embodiment of shock absorber having a damping piston equipped with valve spring plates;

FIG. 14 is a sectional view taken along the line XIV—XIV in FIG. 13;

FIG. 15 is a plan view of the spring element which is effective in the expansion phase; and, FIGS. 16 and 17 are views in plan and side elevation respectively of the spring element which is effective in the compression phase.

DESCRIPTION OF THE PREFERRED EMBODIMENTS

Figure 1:
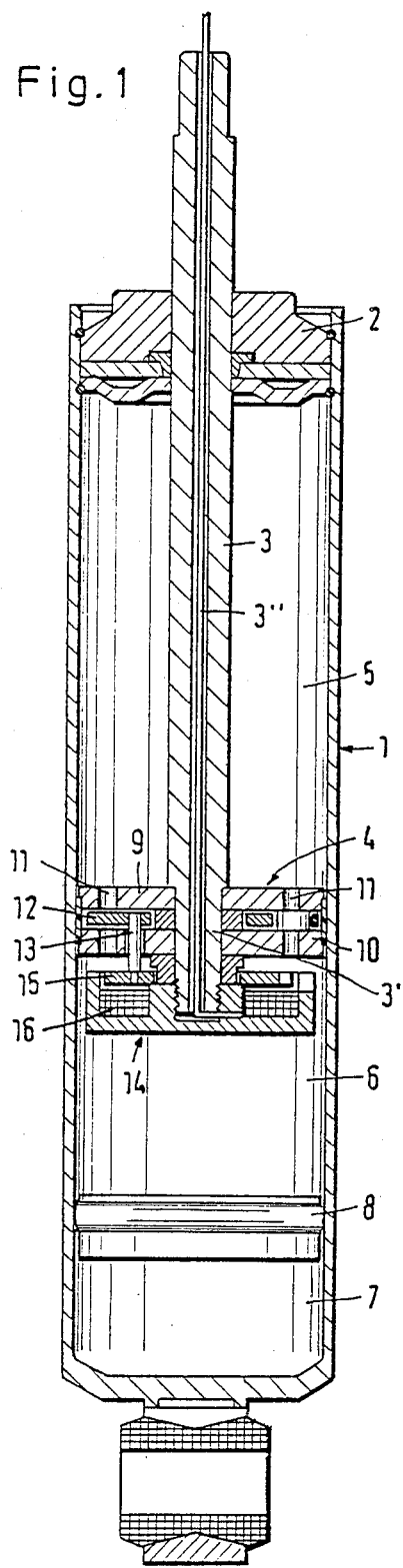
FIG. 1 is an axial longitudinal sectional view through a first embodiment of shock absorber having a rotationally displaceable throttling member.

The adjustable shock absorber which is illustrated in FIG. 1 and which is particularly suitable for motor vehicles is of conventional design insofar as it comprises a cylinder 1 partially filled with damping liquid and with pressurised gas, an axially movable piston rod 3 which extends into and is guided into the cylinder through a seal 2, and a damping piston 4 which is secured to the inner end of the piston rod 3 and which divides the cylinder space filled with the damping liquid into two working chamber compartments 5 and 6. The lower working chamber compartment 6 is divided from a chamber 7 filled with pressurized gas by a separating piston 8 which is guided sealingly within the cylinder 1.

Figure 2:
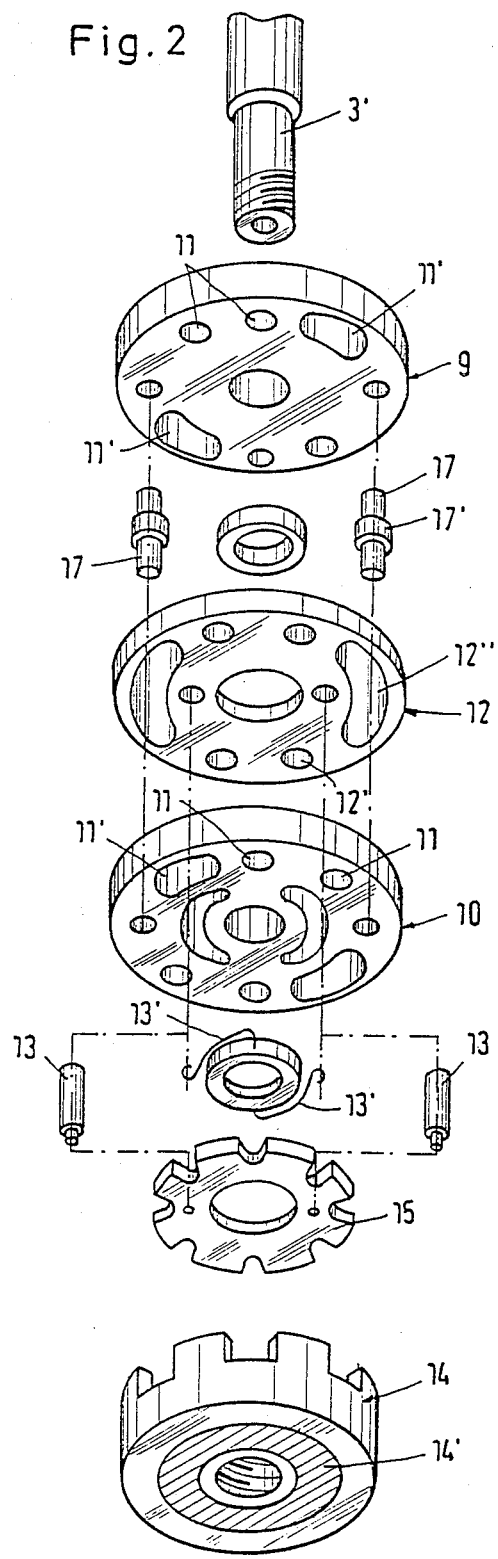
FIG. 2 is an exploded view of the components forming the damping piston in FIG. 1.

As is shown particularly well in FIG. 2, the damping piston 4 includes a piston body which consists of two plates 9 and 10 which are secured to the lower end 3' of the piston rod 3 and through which liquid flow passages 11 are formed. Between the two piston plates 9,10 is mounted a throttling plate 12 which is rotationally displaceable and which is provided with through-flow apertures 12' therethrough which can be brought to a greater or lesser extent into overlapping relationship with the flow passages 11 in the fixed piston plates 9 and 10. The throttling plate 12 is rigidly connected by means of entraining pins 13 which are secured in the throttling plate to a ring armature 15 mounted to be rotationally movable in a piston head 14. The armature 15 is part of a rotary electromagnet which forms the electromagnetic drive. A coil winding 16 of the electromagnet lies in the piston head 14 which is of ferromagnetic material. The ring armature 15, which is likewise made of ferromagnetic material, is provided, in just the same way as the piston head 14, with pole pieces which when positioned opposite each other produce the maximum possible magnetic flux. The current supply to the coil winding 16 is effected through the piston rod 3 which is provided with a suitable bore 3" therethrough for this purpose, and the electrical leads are then taken to a setting or control device provided on the vehicle side of the piston rod. Springs 13' bias the throttling plate 12 into the closed setting, i.e. its central rest position, so that in the event of any loss of current the shock absorber will always still exert a damping force.

In order to be able to achieve a greater range of adjustment and simultaneously to achieve a greater sensitivity, a permanent magnet 14' may be inset into the piston head 14. The restoring force produced by the permanent magnet 14' ensures a normal or average damping without any current supply. The control current then increases or reduces the restoring force of the magnet and thus also the damping force. In this case the springs 13' are not used.

In addition to its through-flow apertures 12' the throttling plate 12 is also provided with two crescent-shaped holes 12" therethrough, through each of which a respective one of two pins 17 extends, with the pins 17 connecting the two fixed piston plates 9 and 10 together. Cylindrical collar-like bosses 17' are provided at the middle of each of the connecting pins 17. These bosses 17' engage sealingly on opposite sides thereof in the crescent-shaped holes 12", with the result that each crescent-shaped hole 12" is divided into two flow inlet holes. The one flow inlet hole is in communication with the upper working chamber compartment 5 and the other flow inlet hole is in communication with the lower working chamber compartment 6, in each case by way of holes 11' provided in the fixed plates 9 and 10. By this means the throttling plate 12 is rotated in one sense or the other, according to the direction of movement of the piston rod 3, by the hydraulic driving force resulting on the particular flow inlet side, and, by means of the rotary electromagnet 14 to 16, a restoring force which is adjustable and is opposed to this rotary displacement can be exerted on the throttling plate 12. Consequently, by appropriate adjustment or regulation of the electrical control current, a particular damping characteristic can be achieved.

Figure 3:
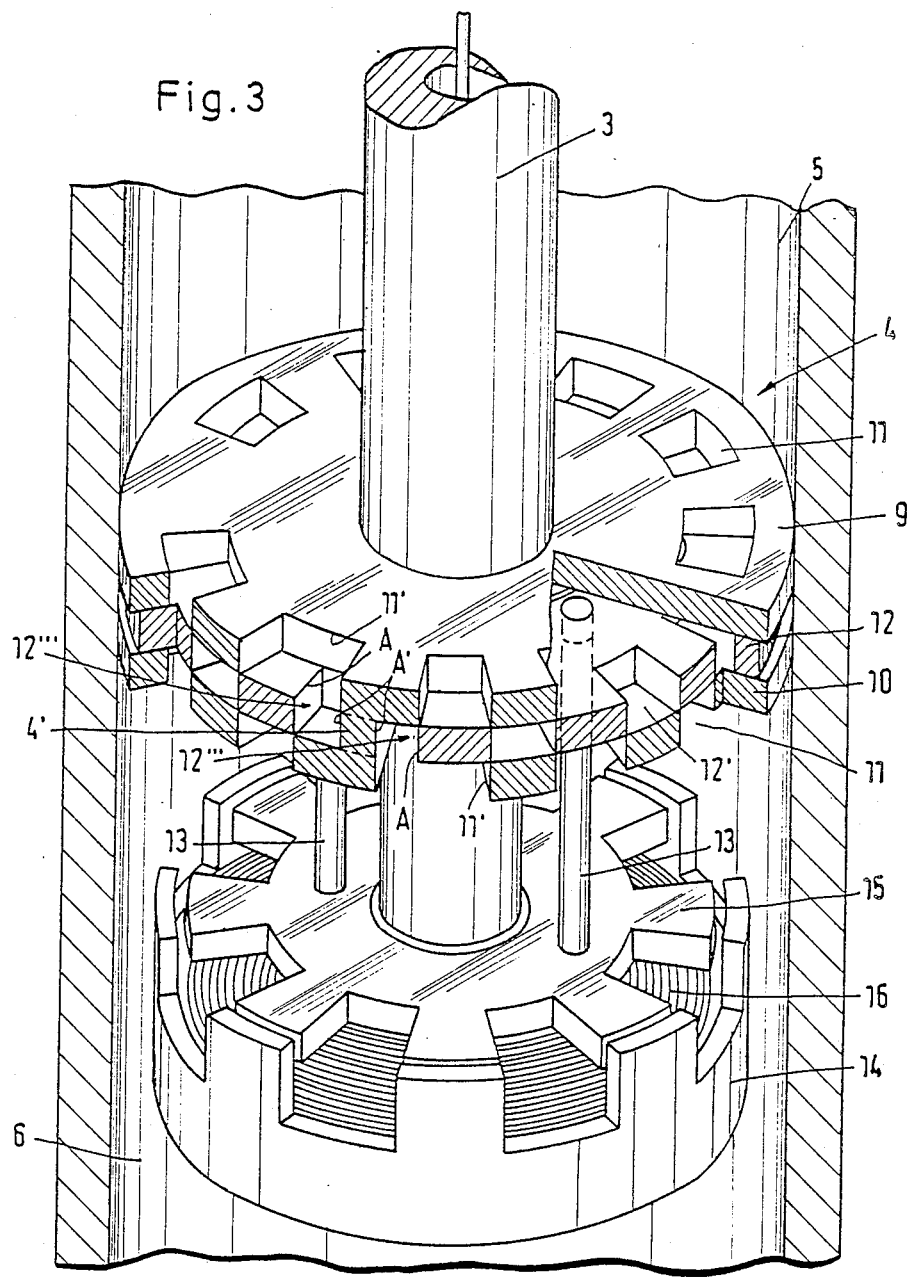
FIG. 3 is a perspective representation of a damping piston fitted with a rotationally displaceable throttling member.
Figure 4:
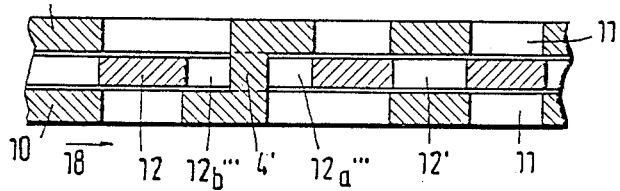
FIG. 4 illustrates the principle by which the damping piston of FIG. 3 operates.

The illustration shown in FIGS. 3 and 4 should make the aforementioned control principle somewhat clearer. The damping piston shown in FIG. 3 corresponds essentially with the damping piston shown in FIGS. 1 and 2. As before, it comprises a rotationally displaceable throttling plate 12 arranged between two fixed piston plates 9 and 10. Flow passages 11 and holes 11' are provided in the fixed piston plates 9 and 10. The through-flow apertures 12' which can be brought into greater or lesser overlapping relationship with the flow passages 11 are arranged in the throttling plate 12. Additionally, there are provided in the throttling plate 12 at least two flow inlet holes 12''' respectively in communication by way of the holes 11' with the one or the other of the working chamber compartments 5 and 6. The flow inlet holes 12''' are defined by face-to-face opposed pressure reaction surfaces A, A', seen in the direction of rotary displacement of the throttling plate 12, one on the plate 12 and the other on a piston bridging piece 4'.

As will be clearly apparent from the associated schematic illustration in FIG. 4, with a downward movement of the damping piston, i.e. with the insertion movement of the piston rod, the liquid pressure arising at the flow inlet hole 12'''a causes the throttling plate 12 to be displaced rotationally in the direction of the arrow 18, whereas,in the event of an extension movement of the piston plate, the pressure increase in the flow inlet chamber 12'''b arising therefrom causes the throttling plate to be rotationally displaced in the opposite direction. By controlling the current flowing through the coil winding 16 of the electromagnet the aforementioned rotary displacement movement can be appropriately counterbalanced and thereby the particular amount of rotary displacement of the throttling plate 12 can be controlled with considerable sensitivity, whereby again the liquid flow through the piston passages and consequently also the damping force can be correspondingly adjusted.

Figure 5:
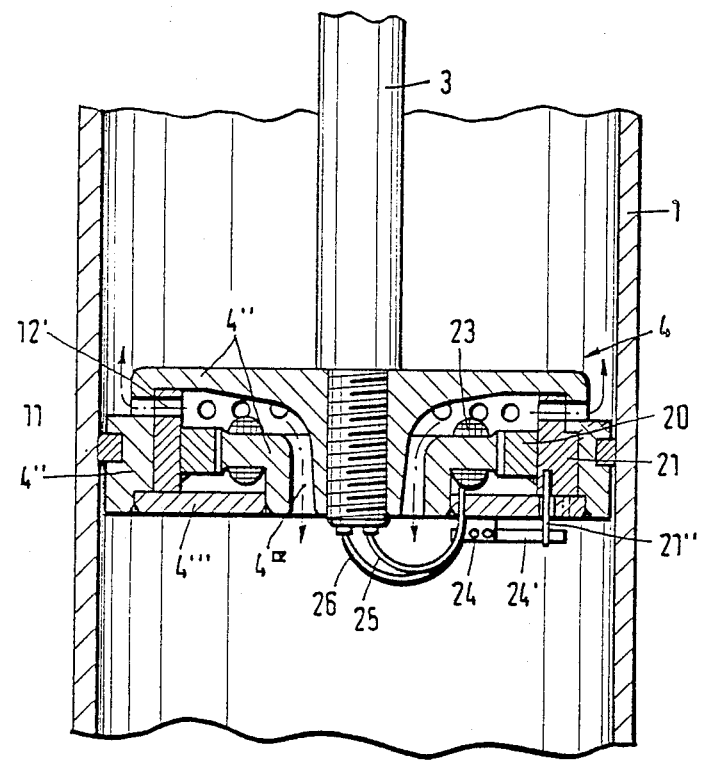
FIG. 5 is an axial partial sectional view through a second embodiment of shock absorber having a rotationally displaceable throttling member in the form of a ring armature.
Figure 6:
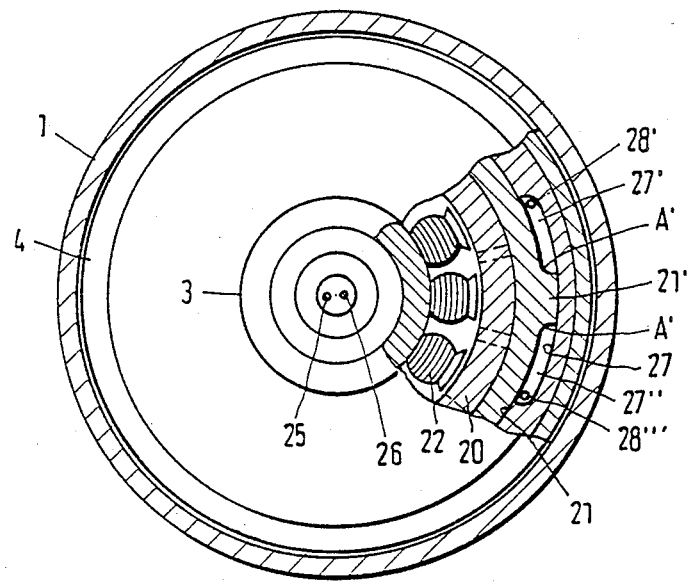
FIG. 6 is a plan view, partly cut away, showing the damping piston of the shock absorber of FIG. 5.

The adjustable shock absorber shown in FIGS. 5 and 6 is also provided with a rotationally displaceable throttling member, but here this is in the form of a ring armature 21 which is provided with alternating, oppositely-poled permanent magnets 20 and which by virtue of its low weight and space-saving construction is integrated directly into the piston body 4" of the damping piston 4. The piston body 4" is made appropriately hollow and is provided with a bottom cover 4'''. The ring armature 21 here encircles the coil winding 23 of an electromagnet, the coil winding being provided with a plurality of radial pole pieces 22 and being positioned centrally of the piston body. The coil winding 23 can be connected by means of a switch 24 alternately to one or other of two control current supply leads 25 and 26 for the expansion and compression phase damping, the connection being synchronised with the alternating direction of rotary movement of the ring armature 21. Both current supply leads 25,26 are guided up through the piston rod 3 to operating or control means at the vehicle side of the piston rod.

As can be seen from FIG. 6, an arcuate flow inlet groove 27 is machined into the inner wall of the piston body 4" which surrounds the ring armature 21. The flow inlet groove 27 defines two flow inlet holes 27',27". The two flow inlet holes 27',27" are in communication by way of a connecting passage 28' or 28" with the one or other working chamber compartment 5 or 6. A projection 21' provided on the external periphery of the ring armature 21 and defining fluid pressure reaction surfaces A' on each side thereof projects sealingly into the flow inlet groove 27. In this way, here again, the ring armature 21 is rotationally displaced to a greater or lesser degree in the one or other direction in accordance with the direction of movement of the damping piston 4 and the hydraulic pressure difference arising therefrom. This rotational displacement can be opposed by energising the coil winding 23 of the electromagnet to a greater or lesser degree, and consequently a corresponding effect can be created on the damping behaviour of the damping piston. The switch 24 comprises a fork 24'. The switch is approriately reversed by the ring armature in its alternating direction of rotation by an entraining pin 21" secured to the ring armature 21 and projecting into the fork 24' striking the fork. By means of the switch the coil winding 23 can be energised with the control current desired for the particular expansion and compression phase damping, so that thereby any desired damping force diagram can be achieved, since the liquid flow through the passages 11,12' and $4^{IV}$ can be allowed to flow more or less freely or be throttled in both directions, corresponding to the indicated double arrows. For the rest, it will be understood that in the event of current failure the damping piston 4 here also, as in the other embodiments, is not blocked but is opened for the through flow of liquid by the hydraulic pressurisation of the throttling plate 12 and of the ring armature 21 arising through the flow inlet holes, with the result that only the force of the permanent magnet controls the particular damping.

Instead of the ring armature 21 fitted with permanent magnets 20 as provided in the embodiment shown in FIGS. 5 and 6, a suitably designed, axially displaceable throttling member can alternatively be used, in which the flow passages and flow inlet holes are suitably modified. By making the throttling member axially displaceable, the electromagnetic drive can be further simplified.

The adjustable shock absorber shown in FIGS. 7 and 8 is of particularly simple construction. The damping piston 4 is here provided with respective pairs of liquid flow passages 31,31' for the compression phase and expansion phase damping. The passages are each offset by 90° relative to each other and are covered, in respective pairs, by valve spring plates 32 and 32' which are secured centrally on the piston rod end 3' and which are arranged on the opposite end faces of the damping piston 4. Backing the substantially rhombic-shaped valve spring plates 32 are support plates 33 and 33' which are essentially H-shaped. Rod armatures 34 positioned to lie on both sides of the valve spring plates 32 and 32' are secured to these support plates 33 and 33', the rod armatures projecting into coil windings 35 of an electromagnet set into appropriately positioned pocket recesses 36 of the damping piston 4. The coil windings 35 are connected by way of a current supply conductor 37 with an adjusting or control member provided on the vehicle side of the shock absorber. The rod armatures 34 project almost down to the base 36' of the pocket recesses 36 and, like the damping piston 4 are made of ferromagnetic material so that here also corresponding electromagnetic force effects result. When the piston rod 3 moves inwards, the damping piston 4 moves downwards, so that the valve spring plate 32 and also its support plate 33 is bent upwards to a greater or lesser degree by the hydraulic pressure arising in the liquid flow passages 31. This bending deformation can be opposed to a greater or lesser extent by appropriate adjustment of the control current in the electromagnet coils 35 and thus of the restoring force exerted by the rod armature 34 on the plates 32 and 33, so that here also a damping diagram of any characteristic can be achieved by the use of the electromagnet coils incorporated directly into the piston 4. In this embodiment the electromagnetic restoring force has to be comparatively large, in order to be able to oppose directly the fairly high liquid reaction pressures.

Figure 9:
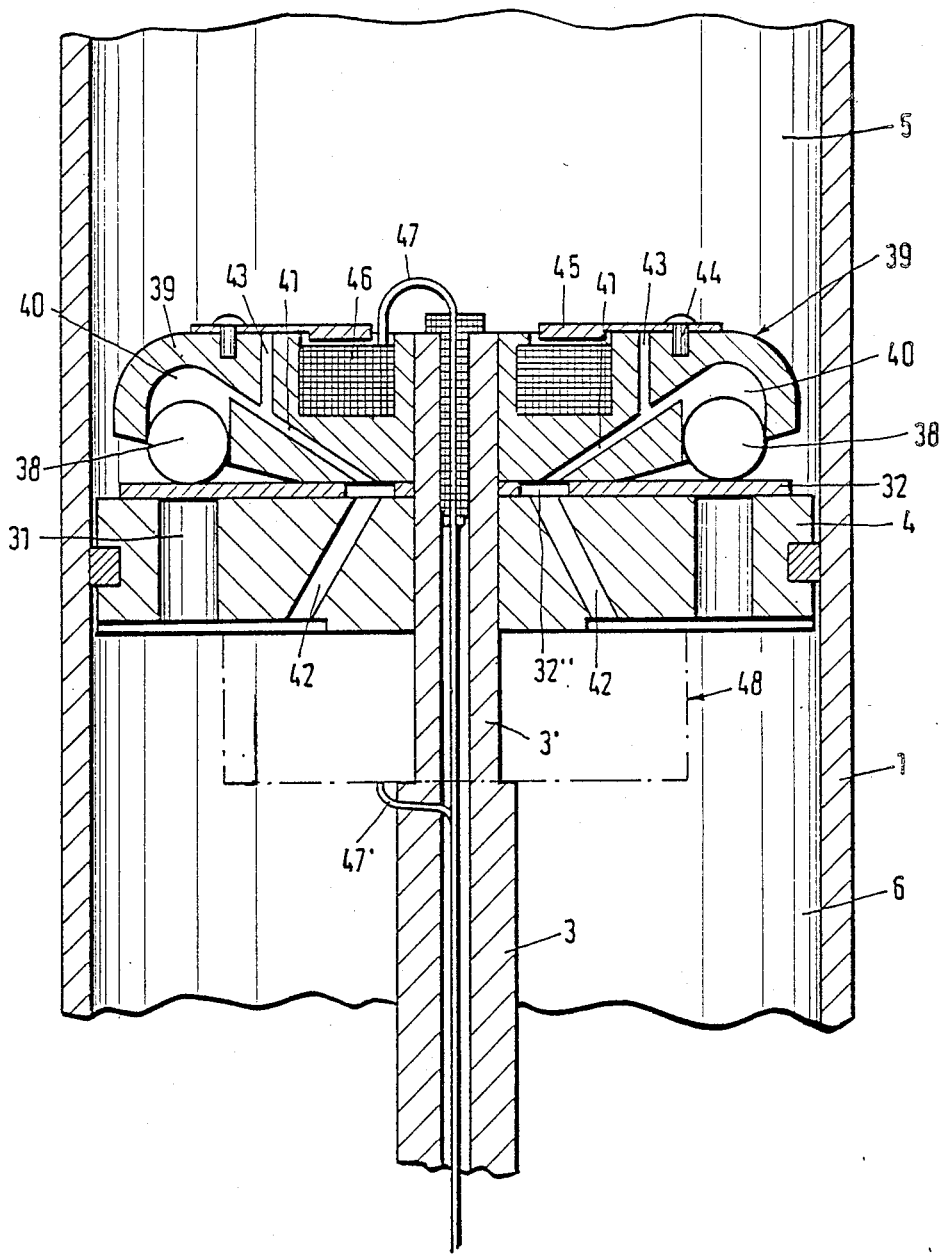
FIG. 9 is a sectional view through a further embodiment of shock absorber in which the piston is provided with a hydraulic compensating device.

Substantially more favorable control and adjustment possibilities for the damping force curve can be achieved with the embodiment illustrated in FIG. 9, in which the liquid flow through the flow passages 31 provided in the damping piston 4 is controlled likewise by one or more valve spring plates 32 set centrally on the end 3' of the piston rod. A difference between this embodiment and the embodiment shown in FIGS. 7 and 8 is the fact that here, between the valve spring plate 32 and the electromagnetic drive opposing its hydraulic displacement, there is provided a hydraulic compensating device which reinforces this restoring force. This compensating device comprises, in the present embodiment, support members 38 which engage with the rear side of the valve plate 32 and which are hydraulically pressurizable in opposition thereto, the support members 38 being axially displaceably mounted in a pressure reaction chamber 40 within a piston cover 39. This reaction chamber 40 is in permanent communication with the working chamber compartment which is positioned on the inflow side with reference to the valve spring plate 32, in the present case the lower chamber 6, by way of liquid passages 41 provided in the piston cover 39, holes 32" in the valve spring plate 32, and passages 42 in the piston body. Since the support members 38, which may be formed for example as balls or even pistons, are in this case of a diameter which is somewhat greater than the diameter of the liquid flow passages 31 positioned below them, this ensures that there is no bending out of the valve spring plate 32 in the event of an outward movement of the damping piston 4, since the pressure in the reaction chamber 40 corresponds to the inflow pressure created in the passages 31.

It is essential however that relief passages 43 branch off from the liquid supply passages 41, these relief passages leading to the other working chamber compartment, here the upper working chamber compartment 5, and having their mouths closed off by an auxiliary valve plate 45 which is mounted at its periphery on the piston cover 39, for example by means of connecting pins 44. This auxiliary valve plate 45 forms the armature of an electromagnet which has its coil winding 46 appropriately let into the piston cover 39 and whose current supply lead 47 is again here guided through the hollow piston rod 3 to the outside of the unit. As is indicated by the chain-dotted line 48, there is provided at the underside of the damping piston 4 a correspondingly constructed hydraulic compensating device offset by 90° relative to the upper compensating device and equipped with electromagnetic drive means for the compression phase damping, with a current supply lead 47' for the electromagnetic drive means likewise being guided out of the unit through the piston rod 3.

Upon the outward extension movement of the piston rod 3, i.e. with the corresponding downward movement of the damping piston 4, there is a build-up of pressure in the reaction chamber 40 through the supply passages 41, 42, this build-up of pressure corresponding to the pressure in the lower working chamber compartment 6 and in the piston passages 31. This hydraulic pressure also acts on the very small diameter relief passages 43 and consequently also on the auxiliary valve plate 45 which is thereby raised to a greater or lesser extent, this leading to a corresponding pressure drop in the relief passages 43 and consequently also in the reaction chamber 40, whereby the valve spring plate 32 is raised from its seat on the upper surface of the piston by the action of the hydraulic pressure in the piston passages 31 and as a result the liquid flow passages 31 are opened. Since on the other hand however, by adjustment of the control current flowing through the coil winding 46 of the electromagnet, the auxiliary valve plate 45 which forms the electromagnet armature can be attracted back into its closed position by the application of a greater or lesser restoring force, in this way, by means of the relief passages 43, the hydraulic pressure in the reaction chamber 40 and consequently also the reaction pressure on the supporting balls 38 can be varied, with the result that the hydraulic displacement or bending force exerted through the piston passages 31 on the valve spring plate 32 is opposed, that is to say a corresponding adjustable restoring force is exerted on the valve spring plate 32. Thus, as has been demonstrated already in practice, the damping force can be adjusted extremely rapidly. For example, within a single movement phase, i.e. approximately during the extension movement of the piston rod in the expansion phase, damping force oscillations of surprisingly high amplitude and frequency can be achieved in the damping force-piston movement diagram. It follows from this that with such a damping piston and with the associated electrical control device it is possible without difficulty to obtain damping force diagrams of any desired characteristics, especially such diagrams with maximum energy dissipation. It should be understood that the same results can also be achieved during the relevant compression phase of the shock absorber by the corresponding electro-hydraulic compensating device 48 which is mounted on the underside of the damping piston 4 for this purpose.

Figure 10:
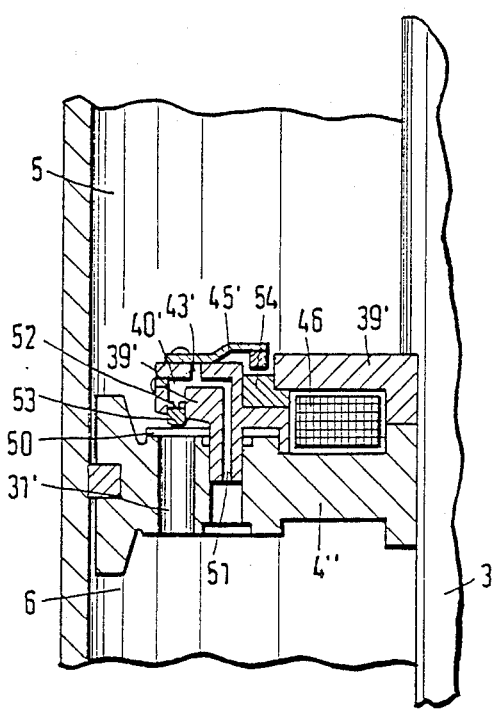
FIGS. 10 and 11 are views in axial section and in plan respectively of yet another form of shock absorber piston provided with a hydraulic compensating device.
Figure 11:
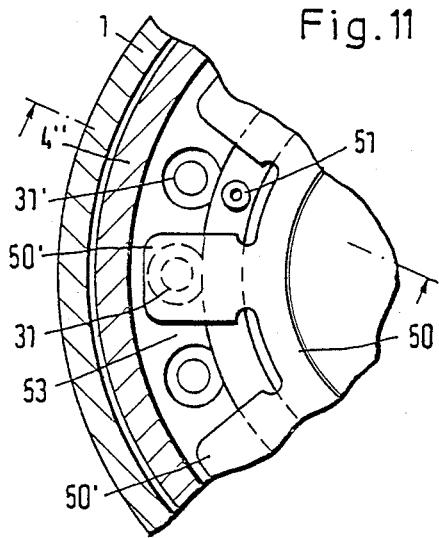
Figure 13:
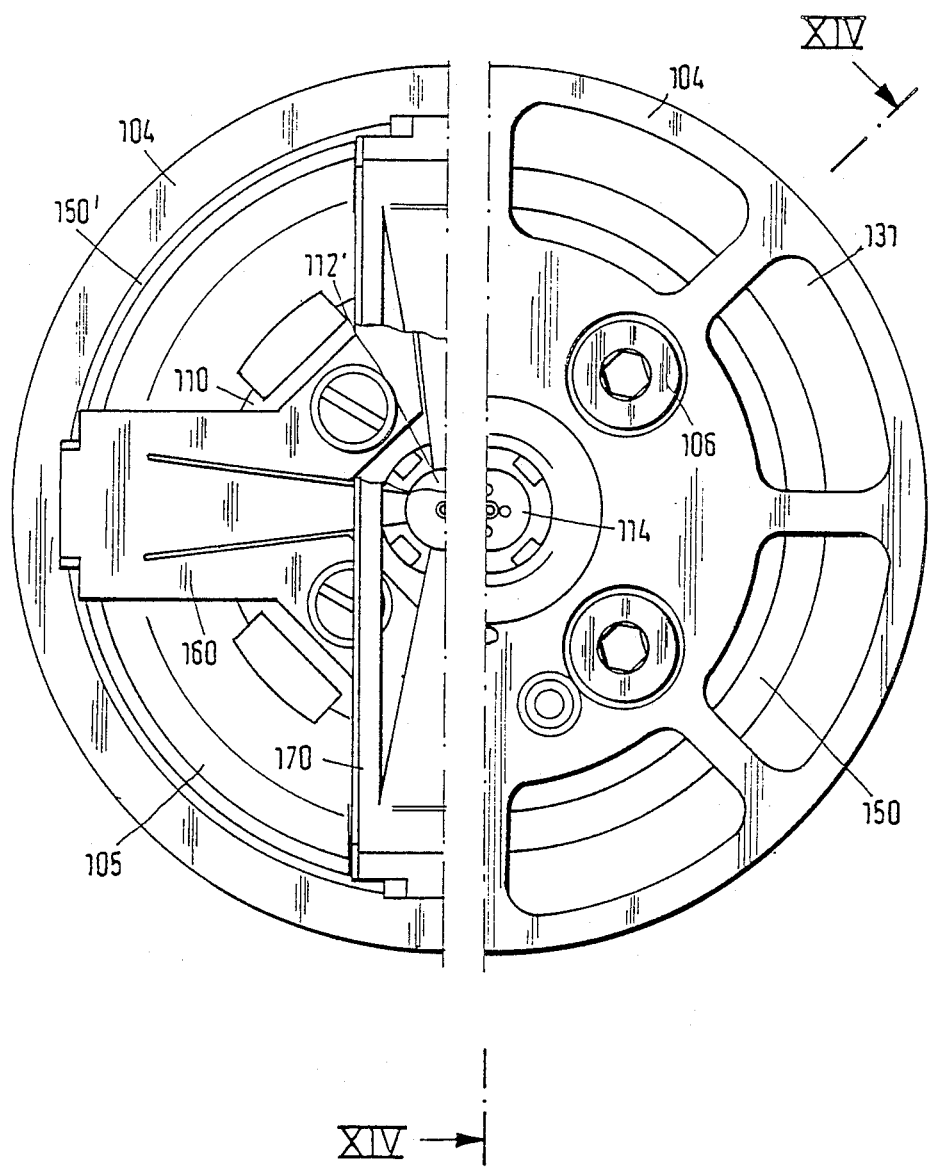
FIG. 13 shows a damping piston provided with only one throttling valve member for both directions of movement, one half of the illustration being a top plan view and the other half being a plan view from below.

The shock absorber piston illustrated in FIGS. 10 and 11 is designed to have essentially the same character and mode of operation as the shock absorber shown in FIG. 9, but is of simpler construction. In this embodiment the liquid flow passages 31,31' which are alternately effective for the compression and expansion phases are closed off by tongues 50' of an annular valve spring plate 50 which is mounted between the piston body 4" and a piston cover 39'. In the piston cover 39' are provided a plurality of circumferentially equispaced supply passages 51 which permanently connect the reaction chamber 40', which is here an annular chamber, with the lower working chamber compartment 6. In the annular reaction chamber 40' there is mounted an axially displaceable support ring 53 which forms the support member, which is provided with a seal 52, and which engages against the rear side of the individual tongues 50' of the associated annular valve spring plate 50. On the other hand the support ring 53 leaves open or bridges over the entrances to the intermediate liquid flow passages 31 of the other passage group which is provided for the expansion phase damping. Relief passages 43' branch off from each of the feed passages 51. These relief passages 43' lead to the other working chamber compartment 5 and are closed off by an auxiliary valve plate 45' or alternatively by a number of suitably arranged separate valve elements. The coil winding 46 of the electromagnet is positioned between the piston body 4" which is made of ferromagnetic material and the piston cover 39'. Within an annular recess in the piston cover 39' is set, beneath the auxiliary valve spring plate 45' or the separate valve elements, a ring 54 of non-magnetic material. This ensures that the magnetic flux is fully effective on the auxiliary valve plate 45', so that in consequence by suitable adjustment of the control current flowing through the coil winding 46 the auxiliary valve spring plate 45' is urged more or less strongly by the electromagnet into its closed position, whereby here again, just as in the embodiment shown in FIG. 9, the tongues 50' of the annular valve spring plate 50 can be controlled in a correspondingly sensitive manner by means of the correspondingly urged support ring 53, and thus here also the damping force properties can be controlled to an appropriately fine degree.

Figure 12:
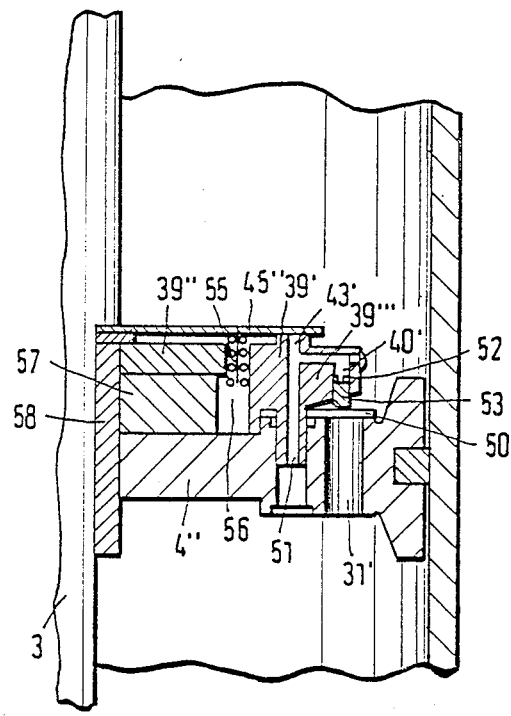
FIG. 12 shows a form of piston with an auxiliary valve plate controlled according to the moving-coil principle.

The damping piston shown in FIG. 12 corresponds substantially in terms of its structural properties with the piston shown in FIGS. 10 and 11, and the corresponding elements are therefore given the same reference numbers, such as for example the piston body 4", the piston cover 39', the supply passages 51, the relief passages 43', the reaction chamber 40' and the sealed annular piston 53. In this embodiment however, as the electromagnetic drive means for the valve spring plate 45" which closes off the relief passages 43', there is provided a moving-coil winding 55 which is mounted at the underside of the valve spring plate and which moves within an annular gap 56 of a permanent magnet circuit which lies between the two piston cover parts 39" and 39"'. The permanent magnet circuit comprises an annular permanent magnet 57, and the piston body 4" and the piston cover parts 39" and 39"', all of which are of ferromagnetic material. Between the piston body 4" and the permanent magnet ring 57 on the one hand and the piston rod 3 on the other hand, there is provided, for the magnetic screening of the permanent magnet, a sleeve 58 of non-magnetic material.

As will be clearly apparent, here also, by a defined control of the electrical control current flowing through the annular coil winding 55, a suitably regulated restoring force can be exerted on the auxiliary valve spring plate 45", and thereby the mouths of the relief passages 43' can be freed to a greater or lesser extent, whereby, by means of the annular piston 53, a correspondingly adjustable counterpressure can be exerted on the annular valve plate 50, so that with this piston arrangement also it is possible to achieve a very sensitive, spontaneous control or adjustment of the damping force behaviour.

Instead of the annular piston 53 which is provided in the embodiment shown in FIGS. 10 to 12, one can alternatively use some other supporting member as a support means for the valve plate 50, particularly for example hydraulically inflatable support members, such as for example tubes, metal bellows or membranes, all of which have the advantage that they can be made simply and above all that they do not need to be specially sealed. These hydraulically inflatable support members are likewise connected with corresponding supply passages 51 and relief passages 43'.

For all the embodiments described above it is a characteristic that with them the throttling member is on the one hand under the force influence produced by the hydraulic pressure difference, and on the other hand is under the influence of the magnetically produced and electrically controlled restoring force which opposes the opening of the throttling member and which is zero in its closed state or central rest position. Thus, all the embodiments described above can be operated not only with continuously adjustable control but also as simple displaceable shock absorbers whose damping force can be set or adjusted solely by means of a variable resistance. The adjustable control provided by the present invention makes it possible without difficulty to compensate for variations in the damping characteristic arising for example from manufacturing tolerances, temperature differences and the like.

It will be appreciated that in all the embodiments in which only one electromagnetically controllable hydtaulic compensating device for the driving of the throttling member is illustrated, a correspondingly constructed second electro-hydraulic compensating device can be provided on the damping piston for the other direction of movement of the piston and of the piston rod, so that the damping force behaviour can be appropriately controlled both in the compression phase and also in the expansion phase of the shock absorber. This control can be effected both manually and also, and especially, automatically in dependence upon the most varied influencing factors with a view to achieving maximum travel comfort and travel safety.

In contrast to the embodiments described above, the damping piston which is illustrated in FIGS. 13 to 17 is equipped with only a single throttling valve member with reaction chamber and electromagnetically energisable control valve for both working directions. The damping piston which here again divides the cylindrical chamber containing a damping fluid, particularly damping oil, into two working chamber compartments $A_1$ and $A_2$, comprises a damping piston body 104 connected to the piston rod by means of a screw thread connection 104'. As can be seen particularly clearly from the right-hand half of FIG. 13, the damping piston body 104 is provided with oil flow passages 131 arranged distributed at equal intervals around its circumference, these passages narrowing in a funnel-shaped manner towards the underside of the piston body and issuing into a recess 104'' in the piston body. This piston body recess 104'' is encircled by a closure rim 104''' which extends around it.

A cup-shaped insert member 105 is secured in the piston body 104 by means of fastening screws 106 which extend through corresponding bores in the piston body 104. Within the insert member 105 there is located a permanent magnet ring member 107 which is retained in place by a pole piece plate 108 which for its part is secured to the lower end of a valve sleeve 109 which is supported in a central recess in the insert member 105 and which has an annular flange provided at its other end which engages over the insert member 105. At its lower end the insert member 105 is closed by a closure cover 110 which is set into it. A further valve sleeve 111 is set into a corresponding central bore in this closure cover 110.

A valve needle 112 which forms part of a control valve S is guided axially through the valve sleeves 109 and 111. The valve needle 112 carries, at its two ends, respective control pistons 113 and 114 which are mounted displaceably in corresponding enlargements of the bores through the valve sleeves 111 and 109 respectively. The two control pistons 113,114 are each provided with an annular groove 113' and 114', as well as with an axially extending relief passage 113'' and 114'' which caters for pressure equalisation on the two sides of each piston. The annular grooves 113 and 114 work in conjunction with radial bores 111' and 109' and 111'' and 109'' which are provided in the valve sleeves 111 and 109 respectively.

The first-mentioned radial bores 111' and 109' are in permanent communication by means of connecting passages 115 and 116 in the closure cover 110 as well as in the insert member 105 with an annular reaction chamber 140 which surrounds the insert member 105, while the radial bore 111'' is in communication with the working chamber compartment $A_2$, and the radial bore 109'' is in communication with the working chamber compartment $A_1$ by way of a recess 104$^{IV}$ and a connecting passage 104$^V$. The annular grooves 113' and 114' provided in the control pistons 113,114, as shown in FIG. 14, are arranged offset inwardly relative to the corresponding radial bores 111', 111'' and 109',109'' in the valve sleeves, and indeed are offset by an amount corresponding approximately to half the diameter of the last-mentioned bores.

A coil carrier 120 is mounted on the control valve needle 112 between its two control pistons 113,114. The coil carrier 120 projects into a chamber 121 which lies between the closure cover 110 and the pole piece plate 108. The coil carrier 120 has an axially extending flange 120' which carries on it an electromagnetic moving-coil winding 122. This flange 120' surrounds the pole piece plate 108 and the permanent magnet 107. Between the permanent magnet 107 and the insert member 105 which is made of ferromagnetic material and the pole piece plate, 108 there is a strong permanent magnetic field in which the moving-coil winding 122 can be axially displaced in one direction or the other in accordance with the flow of current controlled from externally, whereby a corresponding electromagnetic displacement or restoring force can be exerted by means of the coil carrier 120 on the valve needle 112 with its control pistons 113 and 114. The true displacement of the valve needle 112 is effected by hydraulic means, and indeed in dependence upon the pressure difference which is present between the two working chamber compartments $A_1$ and $A_2$.

An annular throttling valve member 150 is axially displaceably arranged and sealingly guided on the periphery of the insert member 105 and closes off the reaction chamber 140 as a capping member. This annular throttling member 150 is so designed and arranged that it has a total of three active surfaces which are subjected to the oil pressure. One of these is the surface $F_1$ which faces towards the reaction chamber 140 and which is thus subject to the reaction chamber pressure. On its opposite side are the two concentric annular surfaces $F_2$ and $F_3$ which extend around it. The surface $F_2$ is always subject to the hydraulic pressure created in the working chamber compartment $A_2$ which immediately surrounds the throttling valve member 150, whereas the surface $F_3$ faces towards the oil flow passages 131 and therefore is permanently subjected to the pressure prevailing in the working chamber compartment $A_1$. The size ratios of the three surfaces are so arranged that the surfaces $F_2$ and $F_3$ are of substantially the same area and the surface $F_1$ corresponds in area substantially to the sum of the other two surfaces $F_2$ and $F_3$. Between the two reaction surfaces $F_2$ and $F_3$ the throttling valve member 150 is provided with an annular shoulder 151 which separates the two surfaces from each other. In the rest position this annular shoulder 151 engages against the closure rim 104''' of the damping piston body 104 and thereby closes off the throughflow passages 131.

Two plate springs 160 and 170, shown in FIGS. 15 and 17, are provided on the underside of the insert member 105 and of its closure cover 110. Plate spring 160, which is effective during the expansion phase, has a cruciform shape. It is secured to the closure cover 110 by means of securing screws 162 which extend through screw fastening holes 161, so that its outer ends 163 rest against the lower edge 150' of the throttling valve member ring 150. The plate spring 160 is also provided with internal resilient tongues 164 produced by a suitable stamping operation and the inner ends 164' of which engage over the associated control piston 113 of the control valve S. The inner ends 164' of the spring tongues are therefore pressed more strongly against the control piston 113 the more strongly the opposing bending at the outer ends 163 is effected by the throttling valve member ring 150 in contact therewith in its opening movement. In contrast to the cruciform-shape plate spring 160, the plate spring 170 which is effective during the compression phase is of substantially rectangular shape. It has its outer ends 171 in contact with the lower edge 150' of the throttling valve member 150 and with the ends 163 of the plate spring 160, and spans the cruciform plate spring 163 in the manner as it were of a bridge. The plate spring 170 is likewise provided with internal spring tongues 172 produced by an appropriate stamping operation and which have their inner ends engaging under an entraining collar 112' which sits on the adjacent outermost end of the valve needle 112.

As will be appreciated most clearly from FIG. 14, in the extension movement of the piston rod, i.e. in the expansion phase of the shock absorber, by hydraulic pressurisation the control valve needle 112 is displaced to the left, whereby the passage communication between the control piston 114 and the working chamber compartment $A_1$ is more strongly throttled, while in contrast the fluid communication between control piston 113 and the working chamber compartment $A_2$ is opened to a greater degree, so that there occurs a corresponding pressure drop in the reaction chamber 140 and naturally also a correspondingly different pressure reaction is exerted on the surfaces $F_2$ and $F_3$ of the throttling valve member 150 which as a result is moved to the left and the actual throttling position between the annular shoulder 151 and the closure rim 104''' is freed to a greater or lesser extent for the flow of fluid therethrough. Simultaneously however, by the displacement of the throttling valve member 150, the cruciform-shape plate spring 160 is correspondingly bent outwards at its outer ends 163, which has the result that the inner ends 164' of its spring tongues 164 press ever more strongly against the control piston 113 of the control valve needle 112 which thereby experiences a corresponding mechanical restoring force. Additionally, by adjustment of the current flowing in the moving-coil winding 122, a corresponding electromagnetic adjusting or restoring force can be exerted on the valve needle 112. When the piston rod again travels back into the damping cylinder in the compression phase, then the valve needle 112 is displaced to the right, whereby the reaction chamber 140 is connected more openly, i.e. in a less throttled manner, to the working chamber compartment $A_1$, whereas in contrast the working chamber compartment $A_2$ is more strongly throttled, so that again in this case the throttling valve body 150 performs a corresponding axial opening movement and the actual throttling gap between the annular shoulder 151 and the closure rim 104''' is freed to a greater or lesser extent. Then, by means of the plate spring 170 and its spring tongue ends 172 a corresponding mechanical restoring force is exerted on the entraining collar 112' and consequently on the valve needle 112, and thus its corresponding hydraulic displacement is counterbalanced to a greater or lesser extent. It will be self-evident that in this case also, by the adjustment of the current flowing in the moving-coil winding 122, the valve needle 112 can be subjected additionally to magnetic forces in the one or other direction and consequently the damping force can be appropriately controlled and adjusted.

We claim:

1. An adjustable shock absorber, especially for a motor vehicle, which comprises:
    a cylinder containing a damping fluid;
    a piston in said cylinder subdividing same into two working compartments;
    a piston rod connected to said piston and extending axially from one end of said cylinder said piston rod being sealed relative to said cylinder, said piston and said rod being axially movable in said cylinder, said piston being provided with damping-force generating fluid flow passages interconnecting said compartments;
    a throttle member on said piston for controlling the effective cross section of said passages, said throttle member being biased into an intermediate rest position normally obstructing flow through said passages in the absence of a pressure differential between said compartments induced by movement of said piston in said cylinder and being formed with fluid pressure reaction surfaces responsive to a pressure differental between said compartments upon displacement of said piston in said cylinder to shift said member selectively in one of two opposite throttle-member directions depending upon the sense of the pressure differential between said compartments and the direction of movement of said piston by the fluid force on said reaction surfaces to selectively unblock flow through said passages and thereby vary said effective cross section; and
    electromagnetic drive means including a magnetic circuit affecting said member and a coil on said piston for generating magnetic force in said magnetic circuit for applying a restoring force to said member which is zero in said rest position of said member and which increases progressively as said member is shifted from said rest position by the fluid force on said reaction surface and which is effective selectively in opposite directions depending upon the direction of displacement of said throttle member from said rest position.

2. The shock absorber defined in claim 1 in which the throttle member is mounted to be rotationally displaceable in the piston and includes through-flow apertures which can be brought into alignment to varying degrees with said fluid flow passages which are in a fixed body portion of the piston, in which at least two such fluid passages are provided between the throttle member and the body portion in communication respectively with each of the compartments, and in which said reaction surfaces are provided in said through-flow aperture in a direction of rotational displacement of the throttle member.

3. The shock absorber defined in claim 2 in which the throttle member is formed as a plate and is rigidly connected to an armature of an electromagnet which comprises said electromagnetic drive means, the armature being mounted to be rotationally displaceable in a head portion of the damping piston.

4. The shock absorber defined in claim 3 in which the plate, in addition to said apertures, is also provided with flow inlet apertures positioned on both sides of a fixed piston body bridge portion, and also with fluid pressure reaction surfaces extending perpendicular to a direction of rotational displacement of the plate.

5. The shock sbsorber defined in claim 2 in which the throttle member comprises a ring armature provided with alternate, oppositely-poled permanent magnets, the armature being rotatably mounted in the piston body portion and encircling said coil, said coil being mounted centrally of the piston body portion and being provided with a plurality of radial pole pieces.

6. The shock absorber defined in claim 5 in which a switch arranged to be actuated by the ring armature is provided on the piston body portion, said switch being connected to the coil alternately by way of first and second control current supply leads for the expansion and compression phase damping respectively in synchronism with alternating directions of rotation of the ring armature.

7. The shock absorber defined in claim 5 in which an arcuate inflow groove is provided in an internal wall surface of the piston body portion which surrounds the ring armature, said groove defining two through-flow apertures, and a projection is provided on a periphery of the ring armature projecting sealingly into said groove thereby to define a fluid pressure reaction surface on each side of the projection.

* * * * *